United States Patent
De Armas et al.

(10) Patent No.: US 7,953,603 B2
(45) Date of Patent: May 31, 2011

(54) LOAD BALANCING BASED UPON SPEECH PROCESSING SPECIFIC FACTORS

(75) Inventors: Mario E. De Armas, Wellington, FL (US); Matthew W. Hartley, Delray Beach, FL (US); Joseph I. Herman, Ellicot City, MD (US); Wendi L. Nusbickel, Boca Raton, FL (US); Geetika Tandon, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 1280 days.

(21) Appl. No.: 11/321,291

(22) Filed: Dec. 21, 2005

(65) Prior Publication Data

US 2007/0143116 A1  Jun. 21, 2007

(51) Int. Cl.
G10L 21/00 (2006.01)
G10L 15/00 (2006.01)

(52) U.S. Cl. ............... 704/270.1; 704/270; 704/231

(58) Field of Classification Search ........... 704/270, 704/270.1, 208, 235, 231, 256; 348/14.09, 348/14.08; 381/123
See application file for complete search history.

(56) References Cited

U.S. PATENT DOCUMENTS

| | | | |
|---|---|---|---|
| 5,870,455 A | 2/1999 | Campbell et al. | |
| 6,119,087 A * | 9/2000 | Kuhn et al. | 704/270 |
| 6,122,363 A | 9/2000 | Friedlander et al. | |
| 6,128,646 A | 10/2000 | Miloslavsky | |
| 6,711,159 B1 | 3/2004 | Grabelsky et al. | |
| 6,714,642 B2 | 3/2004 | Dhir et al. | |
| 6,768,716 B1 | 7/2004 | Abel et al. | |
| 6,785,654 B2 * | 8/2004 | Cyr et al. | 704/270.1 |
| 6,898,567 B2 * | 5/2005 | Balasuriya | 704/231 |
| 7,016,844 B2 * | 3/2006 | Othmer et al. | 704/270.1 |
| 7,218,338 B2 * | 5/2007 | McKnight et al. | 348/14.09 |
| 7,406,418 B2 * | 7/2008 | Chiu | 704/270 |
| 2002/0087325 A1 * | 7/2002 | Lee et al. | 704/270.1 |
| 2003/0123432 A1 | 7/2003 | Cheng et al. | |
| 2004/0120510 A1 | 6/2004 | LeBlanc | |
| 2005/0049859 A1 * | 3/2005 | Arun | 704/231 |
| 2005/0065790 A1 * | 3/2005 | Yacoub | 704/231 |
| 2005/0117735 A1 | 6/2005 | Seidman | |

FOREIGN PATENT DOCUMENTS

GB 2325112 A 11/1998
WO 2325112 A 8/2001

OTHER PUBLICATIONS

Hadim, M., et al., "Load Balancing Voice Applications With Piranha", Proceedings of the International Conference on Parallel and Distributed Processing Techniques and Applications, PDPTA '03, Jun. 23-26, 2003, Las Vegas, Nevada, USA, vol. 3.

* cited by examiner

Primary Examiner — Talivaldis Ivars Smits
Assistant Examiner — Farzad Kazeminezhad
(74) Attorney, Agent, or Firm — Patents on Demand, P.A.; Brian K. Buchheit; Scott M. Garrett

(57) ABSTRACT

A machine readable storage can include a set of instructions for load balancing. The storage can include a plug-in receptor of a load balancer. The plug-in receptor can be compliant with a known industry standard and can be is associated with a two or more load balancing algorithms. The load balancer can utilize selected ones of the load balancing algorithms to determine which of two or more voice servers are to handle incoming speech processing requests. Selected ones of the load balancing algorithms can include a speech utilization algorithm. The speech utilization algorithm can calculate a speech utilization score for at least one of the voice servers based upon speech processing specific factors.

19 Claims, 4 Drawing Sheets

200

```
Percentage machine utilization = ((x* cpuPercentUtil) + (y *
    (asr.engines.inuse*100)/asr.engines.max)) + (z *
    (tts.engines.inuse*100)/tts.engines.max)));

/* where: x = 0 or 50%, y = 0, 25, 50 or 100%, z = 0, 25, 50 or 100% */ if algorithm state = dynamic then
    asr.engines.max = ( (GHz of machine * 60%) / cpuPerASR);
    tts.engines.max = ( (GHz of machine * 60%) / cpuPerTTS);
else /* algorithm state is static */
    asr.engines.max = asr.engines.config;
    tts.engines.max = tts.engines.config;
end if;
```

```
ASR duty cycle percentage = #secondsAsrInSession /#secondsTotalSession;
TTS duty cycle percentage #secondsTTSInSession / #secondsTotalSession;

Percentage ASR Utilization = (sessionsPerSecond * ASR duty cycle percentage
    * ASRpredictionPeriod + asr.engines.inuse) / asr.engines.config;

Percentage TTS Utilization = (sessionsPerSecond * TTS duty cycle percentage
    * TTSpredictionPeriod + tts.engines.inuse) / tts.engines.config;
```

FIG. 3

LOAD BALANCING BASED UPON SPEECH PROCESSING SPECIFIC FACTORS

BACKGROUND

1. Field of the Invention

The present invention relates to the field of network load balancing, and, more particularly, to load balancing based upon speech processing specific factors.

2. Description of the Related Art

Load balancers are often used to select one of several available servers for handling an incoming request. One conventional load balancing approach determines a relative load upon a server based upon a response time. For example, a load balancer can "ping" a server and determine load based upon "ping" response time. Another conventional load balancing technique is to use standard hardware metrics, such as memory, Central Processing Unit (CPU) usage, and the like, to determine server load.

A variety of industry standard load balancers exist that allow for load balancing algorithms used by a load balancer to be specified, added, or updated in a plug-in fashion. Most load balancers in use today fail to take into consideration server-specific factors that differentiate one voice server from another when assigning requests to request handling servers. Accordingly using conventional technologies, voice servers are treated in a common fashion by the load balancer, even though capabilities of different voice servers can vary significantly from one voice server to another.

No known industry standard load balancer determines load based upon speech processing specific factors, such as factors uniquely related to Text to Speech (TTS) and/or Automatic Speech Recognition (ASR) functions. These factors, which are unique to voice servers and/or speech processing tasks performed by a voice server, can have a significant practical effect on server loads and load determination results. Significant gains over in speech processing efficiency can be achieved by utilizing a load balancer that distributes load based upon speech processing specific factors as disclosed herein.

Additionally, no known voice server uses an industry standard load balancer in any fashion. Instead, most speech servers put the responsibility for load balancing on speech clients, which typically resort to simple round robin routing with client-side hunt lists.

SUMMARY OF THE INVENTION

A load balancing algorithm for voice servers that is based upon speech processing specific factors in accordance with an embodiment of the inventive arrangements disclosed herein. The load balancing algorithm can be based upon a speech utilization score, which reflects an ability for a voice server to accept additional requests for speech services. The algorithm can take into account various resources and factors that affect speech. Additionally, the load balancing algorithm can correspond to a specific voice server and can be specifically adjusted for that voice server. Accordingly, several different voice servers can each determine a speech utilization score based upon a load balancing algorithm uniquely tailored for that voice server.

The present invention can be implemented in accordance with numerous aspects consistent with material presented herein. For example, one aspect of the present invention can include a load balancer that uses one or more plug-in receptors linked to one or more speech utilization algorithms. The speech utilization algorithms can calculate a voice server load based upon a speech processing factors. The load balancer can use these calculations to route speech processing requests to voice servers having available capacity for handling the requests.

The plug-in receptor can comply with a known industry standard and voice server administrators can use standard interfaces to configure speech utilization algorithms. For example, the industry standard can be a JAVA 2 ENTERPRISE EDITION (J2EE) based standard. The plug-in receptor can conform to the JAVA Connector Architecture (JCA). The load balancer can be a WEBSPHERE Application Server (WAS) Edge Server Load Balancer. One or more voice servers that are managed by the load balancer can be WEBSPHERE Voice Servers. The industry standard and compliant components are provided for illustrative purposes only and the invention is not to be construed as limited in this regard.

Another aspect of the present invention is a computer based method for automatically selecting voice servers to handle speech processing requests based upon a speech utilization load. A computer queries one or more voice servers for speech processing load data. A speech utilization score can be calculated for each queried voice server so that each speech processing request is routed to the least loaded server as determined by the results of the query.

Yet another aspect of the present invention can include a system for handling speech processing request. The system can include two or more voice servers and at least one load balancer. The voice servers can handle speech processing requests, such as ASR requests and TTS requests. Each of the voice servers can include a speech load balancer servlet and a J2EE compliant resource adaptor. The resource adaptor can include a load balancing algorithm that computes a load for an associated server based upon at least one speech processing specific factor. The speech load balancer servlet can function as an interface between the load balancer and the resource adaptor.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 is a code example of one contemplated speech utilization algorithm used by a load balancer in accordance with an embodiment of the inventive arrangements disclosed herein.

FIG. 3 is a code example of another contemplated speech utilization algorithm used by a load balancer in accordance with an embodiment of the inventive arrangements disclosed herein.

DETAILED DESCRIPTION OF THE INVENTION

Figure 1:
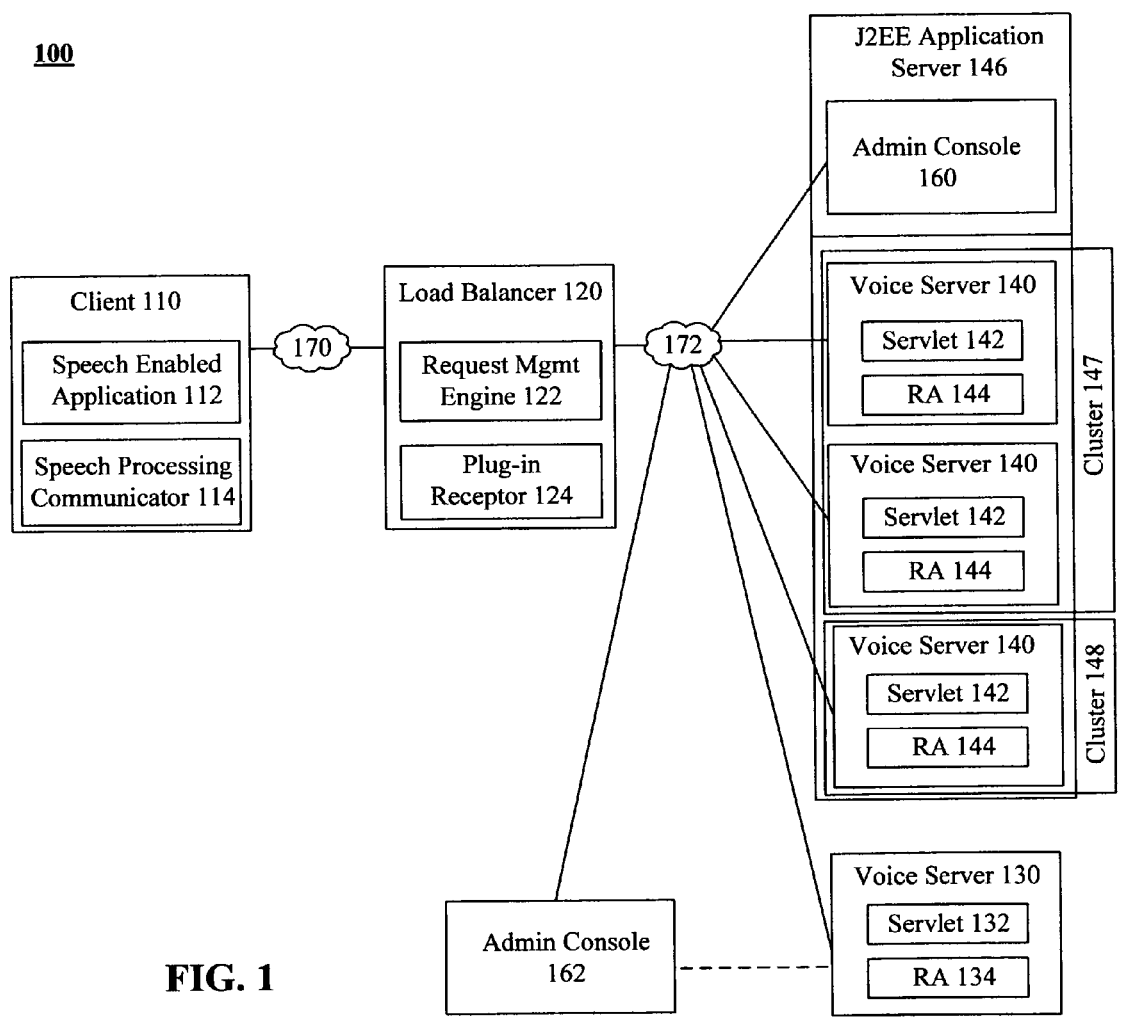
FIG. 1 is a schematic diagram of a system for handling speech processing requests using multiple voice servers in accordance with an embodiment of the inventive arrangements disclosed herein.

FIG. 1 is a schematic diagram of a system 100 for handling speech processing requests using multiple voice servers in accordance with an embodiment of the inventive arrangements disclosed herein. The system 100 can include a client 110 communicatively linked to load balancer 120 via network 170, which is communicatively linked to voice server 130 and 140 via network 172.

Client 110 can be a speech-enabled client where one or more speech processing tasks are performed remotely. Client 110 can include speech enabled application 112 and speech processing communicator 114. The speech processing communicator 114 can be configured to submit speech processing requests to load balancer 120. The communicator 114 can also be communicatively linked to one of the voice servers 130 and/or 140 in such a manner that request specific information can be conveyed to the linked voice server and results from speech processing tasks performed by the linked voice server can be received.

Load balancer 120 can determine a load of a plurality of voice servers 130 and 140 and can select one of the voice servers 130 and 140 to handle incoming speech processing requests based upon the determined load. Request management and routing can be handled by request management engine 122. Load upon the voice servers 130 and 140 can be based at least in part upon speech processing specific factors.

In one embodiment, the load balancer 120 can include a plug-in receptor 124. Plug-in receptor 124 can be associated with one or more load balancing algorithms that are utilized by the request management engine 122. These load balancing algorithms can be added, removed, and updated by an authorized system administrator or system technician in a post deployment stage. That is, the plug-in receptor 124 can provide an extensible means through which load balancing algorithms used by the request management engine 122 can be altered.

The plug-in receptor 124 can be compliant with a known industry standard, such as a J2EE standard. In one embodiment, the J2EE standard can be a J2EE Connector Architecture (JCA) based standard. Utilization of a known industry standard permits third party resellers to construct or customize load balancing algorithms, which will operate in system 100. Additionally, the use of a known industry standard can permit system administrators to leverage existing knowledge of other systems adhering to the known standard, and not require the administrators to be extensively trained on load balancer 120 specific mechanisms, which using conventional technologies are often vender specific proprietary mechanisms.

It is contemplated that the plug-in receptor 124 can be configured so that load balancing algorithms can be directly loaded into load balancer 120, where the algorithms are executed. It is also contemplated, that plug-in receptor 124 be communicatively linked to components residing within voice server 130 and/or 140.

In the later contemplated configuration, load balancing algorithms can be local to the voice servers 130 and/or 140 and can execute locally. Advantageously, using load balancing algorithms local to the voice servers 130 and/or 140 can allow load balancing algorithms to vary by node (or by voice server). Additionally, using local load balancing algorithms can permit local administers with limited privileges (such as privileges for one voice server in a cluster managed by load balancer 120 but not others) to optimize algorithms for that voice server. Further, executing load balancing algorithms to compute a speech utilization load or speech utilization score at the voice server level can be more efficient from a resource consumption perspective, than executing algorithms at load balancer 120. It can also permit a load balancer 120 to be implemented efficiently upon hardware having relatively limited computing resources compared to the resources available to a voice server.

Combinations of these two approaches, where a portion of the load balancing algorithms is contained within a data store local to the load balancer 120 and where a different portion is contained within a data store local to voice server 130 and/or 140, are also contemplated. For example, default load balancing algorithms can be included within load balancer 120 which can be generally used for voice servers 130 and/or 140 that do not have a locally configured load balancing algorithms. In another example, the load balancer can include one or more load balancing algorithms, which are conveyed to voice servers 130 and/or 140 that are being managed. The conveyed algorithms can be executed by the voice servers 130 and/or 140 and the results from the algorithms can be conveyed to the load balancer 120.

Each of the voice servers 130 and/or 140 can be applications capable of performing one or more speech processing tasks, such as a Text to Speech (TTS) task and/or an Automatic Speech Recognition (ASR) task. The voice servers 130 and/or 140 can be grouped into one or more clusters, such as clusters 147 and 148. Additionally, a portion of the voice servers 140 can be implemented within an application server 146. The application server 146 can be a J2EE application server, such as a WEBSPHERE application server (WAS).

Voice servers used in system 100 need not be implemented within application server 146, as shown by voice server 130, but can be implemented in any of a variety of fashions known in the art. For instance, voice server 130 can be a stand-alone device which complies with the industry standard specified for the plug-in receptor 124.

Each of the voice servers 130 and 140 can include a speech load balancer servlet 132 and/or 142 as well as a resource adaptor 134 and/or 144. The speech load balancer servlet 132 and/or 142 can be an interface for communicating with load balancer 120. In one embodiment, servlet 132 and/or 142 can be interfaces to plug-in receptor 124. Servlet 132 and/or 142 can also be interfaces to resource adaptor 134 and/or 144.

Resource adaptor 134 and/or 144 can include a load balancing algorithm used by an associated one of the voice servers 130 and/or 140. The load balancing algorithm can be a speech utilization algorithm that includes one or more speech processing and/or voice server specific factors. The resource adaptor 134 and/or 144 can conform to J2EE Connector Architecture (JCA). Resource adaptors 134 and/or 144 can make deployment, installation, and modification of different load balancing algorithms a relatively simple process.

Administrative consoles 160 and/or 162 can be used by authorized administrators to deploy, add, delete, activate, update, and otherwise manipulate the load balancing algorithms. Administrative consoles 160 and/or 162 can be standardized consoles that conform to known industry standards. For example, administrative console 160 can be a WAS administrative console for deploying J2EE resource adaptor components.

Network 170 and/or network 172 can include any hardware/software/and firmware necessary to convey data Network 170 and network 172 can include local components and data pathways necessary for communications to be exchanged among computing device components and between integrated device components and peripheral devices. Network 170 and network 172 can also include network equipment, such as routers, data lines, hubs, and intermediary servers which together form a data network, such as the Internet. Network 170 and network 172 can also include circuit-based communication components and mobile communication components, such as telephony switches, modems, cellular communication towers, and the like. Network 170 and 172 can include line based and/or wireless communication pathways.

It should be appreciated that the arrangements of system 100 are for illustrative purposes only and that different consistent arrangements are contemplated herein. Illustrative components can be combined within to form a single component that carries out the functions of the discrete components detailed herein. For example, the load balancer 120 can be a component of application server 146. Similarly, singular components of system 100 can be segmented into multiple components that together possess the functionality detailed herein.

FIG. 2 is a code example of one contemplated speech utilization algorithm 200 used by a load balancer in accordance with an embodiment of the inventive arrangements disclosed herein. FIG. 3 is a code example of another contemplated speech utilization algorithm 300 used by a load balancer in accordance with an embodiment of the inventive arrangements disclosed herein. The speech utilization algorithm 200 and/or algorithm 300 can each be one of the algorithms that determine a speech utilization load for voice server 130 and/or voice server 140.

Speech utilization algorithm 200 and algorithm 300 are just two contemplated algorithms for determining load based upon speech processing specific factors. One of ordinary skill in the art could adjust the specifics of algorithm 200 and/or algorithm 300 in a myriad of ways to optimize the algorithm for a particular voice server, speech processing cluster, a speech processing area for which the cluster is optimized, and the like. Consequently, algorithm 200 and algorithm 300 should be construed as concrete examples of a general concept detailed herein. The invention should not be construed as limited to exact details contained within algorithms 200 and/or algorithm 300, but instead should encompass any algorithm that determines load from one or more speech processing factors.

For example, in another contemplated speech utilization algorithm (not shown), the speech utilization score can be based on an ability of a remote voice server to deliver real-time audio back to a caller. This algorithm could be primarily used for a TTS speech processing task. For instance, an real time speech delivery metric and/or computation can show that 5% of audio packets are being delivered outside a 20 millisecond real-time delivery rate window. This percentage can be converted into a speech utilization level of 1, which indicates a relatively light load. Factors can be adjusted to ensure that real-time or near real time delivery of speech is achieved. Some of these factors can include adding a prioritization scheme to increase a relative priority of request that have real-time performance considerations compared to other requests that do not have real-time performance considerations.

The following conventions are utilized for algorithms 200 and 300, each of which accepts speech processing specific factors as input. Other factors, not specific to voice servers, such as CPU cycles consumed on a server, a number of CPU's per server, response time from a ping, and the like can be combined with the speech processing specific factors. It should be noted that the inputs provided below are not intended to be a comprehensive list of inputs that can be used to determine a speech utilization score and that not all of the inputs described herein are to be used by every speech utilization algorithm.

CHART 1

INPUT TO ALGORITHMS (1) Number of allocated ASR and/or TTS engines - defined as the number of ASR and/or TTS engines in use
(2) Number of configured ASR and/or TTS engines - defined as the number of total ASR and/or TTS engines that handle requests
(3) CPU MHz per channel for ASR and/or TTS engines - can be the actual available CPU cycles for speech processing engines. Can be computed by historical usage computations that are periodically updated, by real time utilization data, and the like. Many server and/or virtualization applications permit a fixed amount of CPU processing power to be reserved for designated speech processing engines.
(4) Duty cycle for ASR and/or TTS - can be computed in a variety of manners
(5) Average ASR and/or TTS latency - obtained from a real-time response measurements
(6) Average ASR and/or TTS grammar size - the size of the recognition grammar or speech generation grammar
(7) Total number of ASR and/or TTS processing requests - obtained from a real-time system measurements
(8) Number of active speech processing sessions - obtained from a real-time system measurements
(9) Total number of concurrent speech processing sessions permitted - based upon hardware/software or licensing limitations
(10) Average length of ASR and/or TTS engine usage per session - statically or dynamically computed from historical data The output of a speech utilization algorithm is a speech utilization score. In one embodiment, this score can be expressed as a computed percentage of server utilization. The score or percentage can also be divided into various utilization levels. As shown below, four utilization levels have been established, which include low, medium, high, and full. The number of utilization levels utilized is variable, and any number of levels can be established. In the convention used below, a higher utilization level or utilization weight indicates a greater load.

CHART 2

SAMPLE OUTPUT FROM ALGORITHMS

| Server Utilization | Load Range | Utilization Level |
|---|---|---|
| Low (light load) | 0%–33% | 1 |
| Medium (moderate load) | 24%–66% | 2 |
| Heavy (heavy load) | 67%–99% | 3 |
| Full | 100% | 4 |

Algorithm 200 is based upon a number of in-use speech engines relative to a number of configured engines as well as other factors, such as CPU utilization. Specifically, a percentage of machine utilization can be computed from X times a CPU percentage utilized plus Y times a number of ASR engines in use divided by a number of ASR engines max plus Z times a number of TTS engines in use divided by a number of TTS engines max. Here X, Y, and Z represent configurable parameters that can be adjusted to increase the weight of one speech processing factor relative to another factor when computing the speech utilization score.

Algorithm 200 can be set to operate using either static or dynamic factors, which alter the manner in which ASR engines max and TTS engines max are computed. When in a dynamic configuration, ASR engines max and TTS engines max can be computed based upon a total processing power of a machine and a number of CPU's per machine. For example, ASR engines max can equal a GHz rating of a machine times sixty percent divided by the number of CPU's per ASR. The TTS engines max can be equal to a GHz rating of a machine times sixty percent divided by the number of CPU's per TTS.

When in a static configuration, ASR engines max can be equal to the total number of ASR engines configured. TTS engines max can be equal to the total number of TTS engines configured.

An example of a dynamic factor computation for Algorithm 200 is presented below, where X=0%; Y=100%; and Z=0%:

1) CPUperASR = 50 MHz (obtained from a configuration tool)

2) GHz of machine = 4 GHz (obtained from system info)

3) ASR engines in use = 12 (obtained from configuration tool)

4) asr.engines.max = ((GHz of machine * 60%)/CPUPerASR) =

4 GHz * 60% / 50 MHz = 2.4 GHz/50 Mhz = 48.

5) Percentage machine utilization = ((X * cpuPercentUtil) + (Y *

(asr.engines.inuse * 100)/asr.engines.max)) + (Z *

(tts.engines.inuse * 100)/tts.engines.max))) =

ASR engines in use / ASR engines max = 12/48 = 25%

6) Utilization level for 25% = 1

EXAMPLE 1

Dynamic Factor Computation

Algorithm 300 computes a speech utilization load based upon a number of sessions, an arrival rate, a duty cycle, and a prediction. A duty cycle percentage equals a number of seconds in a session (ASR or TTS) divided by the number of seconds for a total session. The number of seconds per session and the total seconds per session are statistics that are often maintained by a voice server.

An ASR utilization equals a number of sessions per second times ASR duty cycle times prediction period, plus the number of ASR engines in use divided by the number of configured ASR engines. The TTS utilization equals a number of sessions per second times TTS duty cycle times prediction period, plus the number of ASR engines in use divided by the number of configured TTS engines.

An example of an ASR utilization based upon algorithm 300 is presented below:

1) Seconds ASR in Session = 12 seconds (determined by system stats)

2) Seconds Total Session = 120 seconds (determined by system stats)

3) ASR duty cycle = # seconds ASR in Session/# seconds Total

Session = 12/120 = 10%

4) sessions per second =

20 sessions/second 5) prediction period = 5 seconds

6) ASR engines in used 15 (obtained from configuration tool)

7) ASR engines config =

30 (obtained from configuration tool)

8) Percentage ASR utilization = sessions per second

ASR duty cycle * prediction period + ASR engines in use) / ASR engines config = (20 sessions/sec * 10% * 5 seconds +

15 engines)/30 engines = (10 engines + 15 engines)/30 engines =

25 engines/30 engines = 83%

9) Utilization level for 83% = 3

EXAMPLE 2

ASR Utilization Computation

Figure 4:
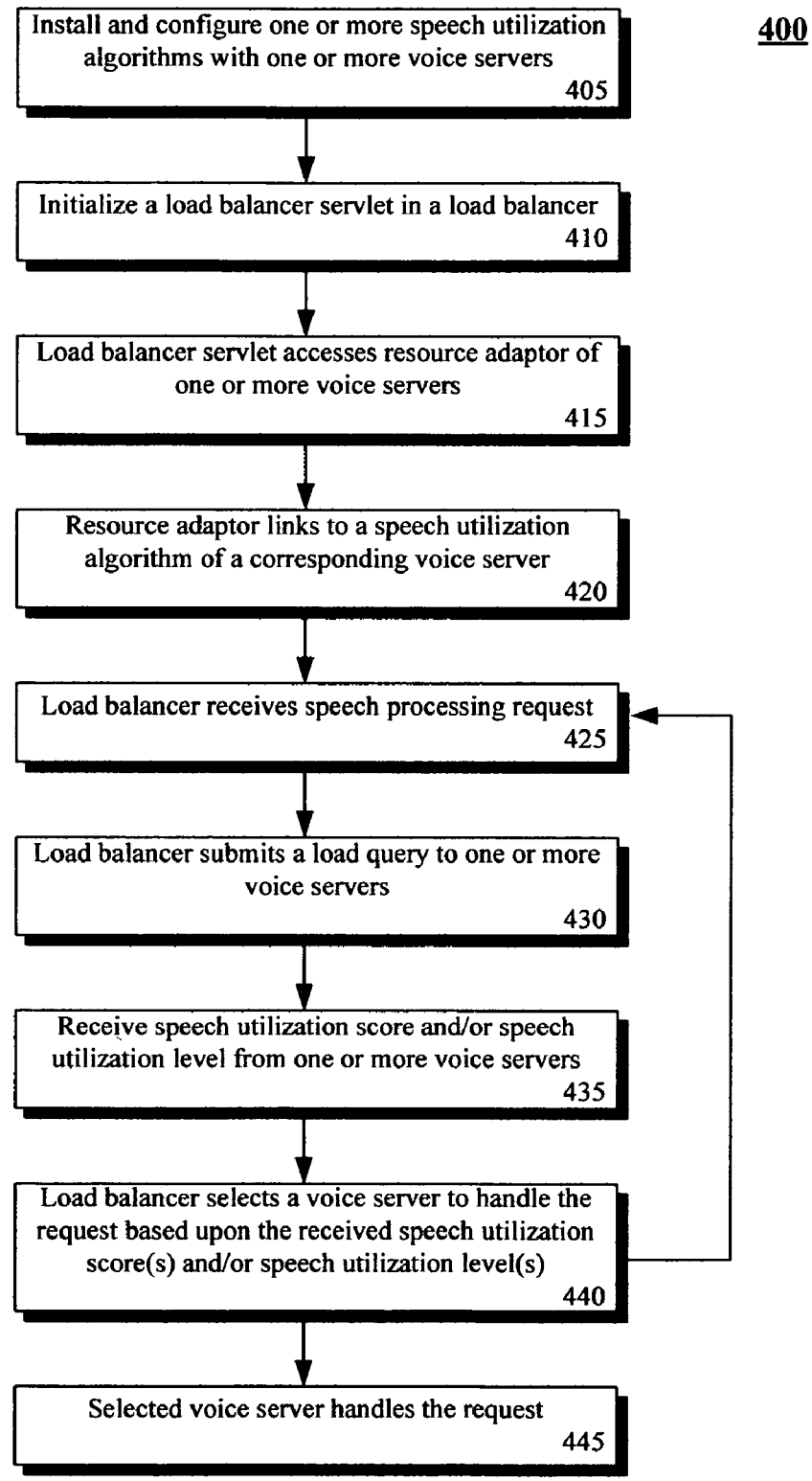
FIG. 4 is a flow chart of a method for implementing speech utilization algorithms in accordance with an embodiment of the inventive arrangements disclosed herein.

FIG. 4 is a flow chart of a method 400 for implementing speech utilization algorithms in accordance with an embodiment of the inventive arrangements disclosed herein. The method 400 can be performed in the context of a load balancer that selects one of multiple voice servers to handle incoming client speech processing requests. In one embodiment, the method 400 can be performed in the context of system 100. The speech utilization algorithm of method 400 can be implemented as algorithm 200, as algorithm 300, or as any algorithm that determines a speech utilization score or speech utilization level using one or more speech processing specific factors.

Method 400 can begin in step 405, where one or more speech utilization algorithms can be installed and configured for one or more voice servers In one embodiment, step 405 can be performed using an administration console that deploys a resource adaptor containing the speech utilization algorithm within the voice servers. In step 410, a load balancer servlet can be initialized. The servlet can be local to the voice servers containing the speech utilization algorithm and/or can be a servlet local to a load balancer that manages speech processing requests for two or more voice servers.

In step 415, the load balancer can access a resource adaptor of one or more of the voice servers. In step 420, the resource adaptor can link to a speech utilization algorithm of a corresponding voice server. Accordingly, the load balancer can be linked to the speech utilization algorithms via the resource adaptors.

In step 425, the load balancer can receive a speech processing request from a client. In step 430, the load balancer can submit load query to one or more of the voice servers. The voice server can execute the speech processing algorithm to determine a speech utilization score. The speech utilization score can be optionally converted into a speech utilization level. In step 435, speech utilization score and/or a speech utilization level can be received by the load balancer from one or more of the voice servers. In step 440, the load balancer can select a voice server to handle the request based upon the speech utilization score(s) and/or speech utilization level(s). In step 445, a selected voice server can handle the request. The request can, for example, be a TTS and/or an ASR processing request.

After the load balancer has assigned a voice server to the request, additional request can be received and/or assigned to available voice servers. Accordingly the method can loop from step 440 to step 425. It should be appreciated that the load balancer can continuously manage new requests as assigned requests are being handled by one or more different voice servers (as shown in FIG. 4 by step 445 and the looping from step 440 to step 425 occurring independent of each other).

Figure 5:
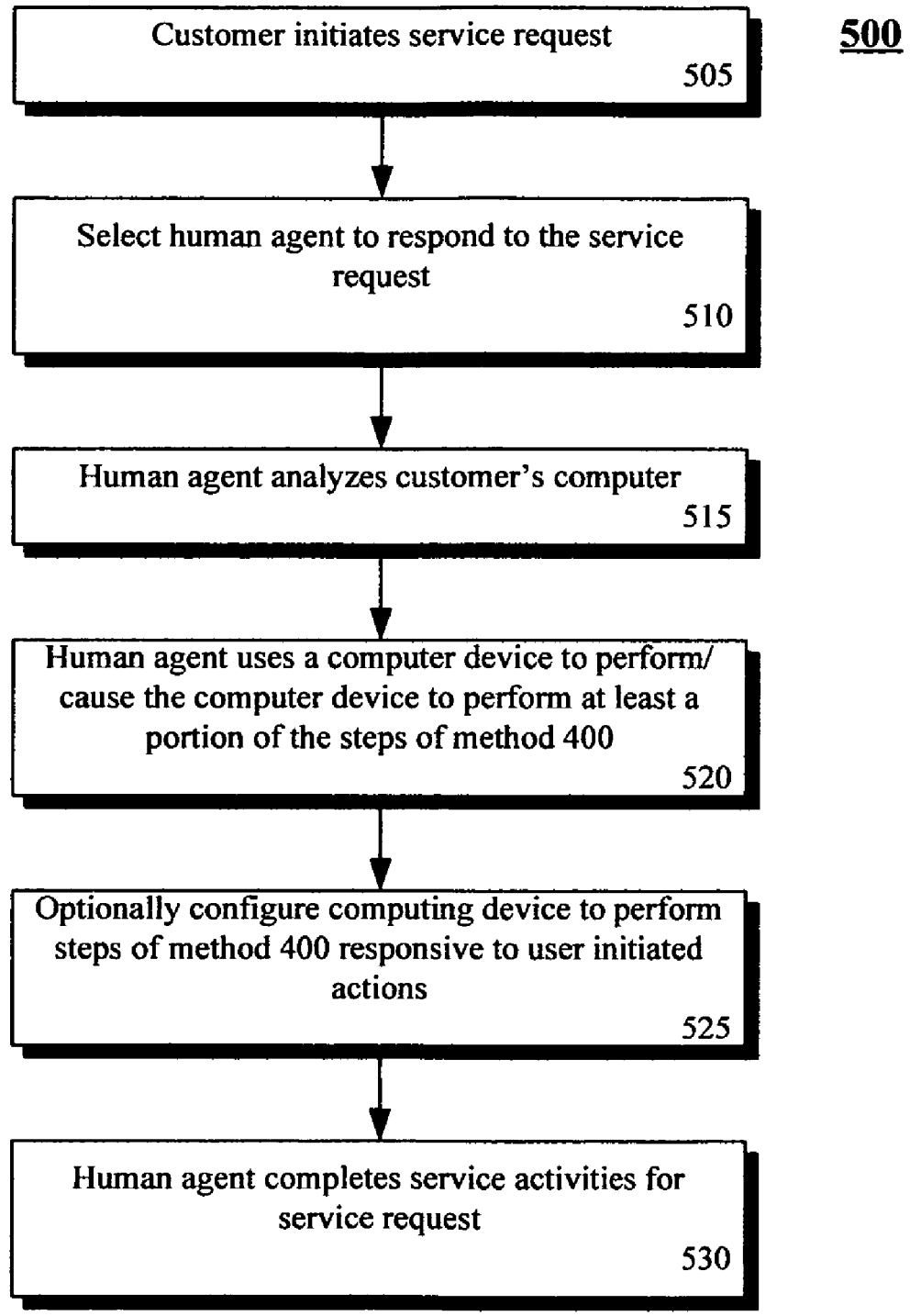
FIG. 5 is a flow chart of a method, where a service agent can configure a speech utilization algorithm for a customer in accordance with an embodiment of the inventive arrangements disclosed herein.

FIG. 5 is a flow chart of a method 500, where a service agent can configure a speech utilization algorithm for a customer in accordance with an embodiment of the inventive arrangements disclosed herein. Method 500 can be preformed in the context of system 100 or in the context of any load balancing system that uses at least one speech utilization algorithm.

Method 500 can begin in step 505, when a customer initiates a service request. The service request can be a request for a service agent to configure a speech processing system for one or more client computers.

Referring to system 100, client 110 can be a customer's computer that utilizes a speech processing service provided by an entity employing the service agent. The speech processing service can utilize load balancer 120 and/or J2EE application server 146 that contains multiple voice servers 140.

In step 510, a human agent can be selected to respond to the service request. In step 515, the human agent can analyze a customer's speech processing needs, equipment, and configuration. Additionally, the human agent can analyze the available capacity of existing voice servers to determine that an existing infrastructure will be able to handle an increased load due to new customer requests. The agent can reconfigure a load balancer and speech utilization algorithms as appropriate to handle present and anticipated loads. The agent can also allocate additional speech processing resources as necessary to handle current and/or anticipated loads.

In step 520, the human agent can use one or more computing devices to perform or to cause the computer device to perform the steps of method 400. For example, the agent can configure customer client devices to automatically convey speech processing requests to a remotely located load balancer. Software components needed to communicate with the load balancer and/or voice servers can also be configured.

Appreciably, the one or more computing devices used by the human agent can include the customer's computer, a mobile computing device used by the human agent, a networked computing device, and combinations thereof. The human agent may make adjustments to a middleware application server and/or to a client operated management information system that utilizes the middleware application server. For example, the human agent can load and configure a speech recognition application within a middleware application server (such as a WAS application server) and can adjust interface parameters of a customer's computer system to interact with the application server.

In optional step 525, the human agent can configure the customer's computer in a manner that the customer or clients of the customer can perform one or more steps of method 400 in the future, such as enabling the customer to automatically perform speech processing requests in the future. In step 530, the human agent can complete the service activities.

It should be noted that while the human agent may physically travel to a location local to adjust the customer's computer or application server, physical travel may be unnecessary. For example, the human agent can use a remote agent to remotely manipulate the customer's computer system and/or an application server.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A machine readable storage including a set of instructions for load balancing, said storage comprising:

identifying a plurality of different load balancing algorithms, each stored in a tangible storage medium and executing, via hardware capable of running the load balancing algorithms, within one of a plurality of different voice servers, each load balancing algorithm generating a speech utilization score that reflects an ability of the corresponding voice server to accept additional requests for speech services, wherein each load balancing algorithm is uniquely tailored for the voice server to which it corresponds, wherein each load balancing algorithm calculates the speech utilization score for the corresponding voice server based upon at least three speech processing specific factors of that voice server;

at least one plug-in receptor hosted within a load balancer comprising software stored on a tangible storage medium and executable by computing equipment that is remote from any of the different voice servers, wherein the plug-in receptor is compliant with a known industry standard and is associated with the plurality of different load balancing algorithms; and the load balancer operable to utilize the speech utilization scores produced by the voice servers executing the load balancing algorithms to determine which of a plurality of different voice servers are to handle incoming speech processing requests, wherein the speech processing specific factors used to calculate the speech utilization score include at least three factors selected from a group consisting of a number of allocated ASR engines, a number of allocated TTS engines, a number of configured ASR engines, a number of configured TTS engines, a CPU MHz per channel for ASR, a CPU MHz per channel for TTS, a duty cycle for ASR, a duty cycle for TTS, an average ASR latency, an average TTS latency, an average ASR grammar size, an average TTS grammar size, a total number of ASR processing requests, a total number of TTS processing requests, a number of active speech processing sessions, a total number of concurrent speech processing sessions permitted, an average length of ASR engine usage per session, and an average length of a TTS engine usage per session.

2. The machine readable storage of claim 1, wherein the known industry standard is a J2EE standard.

3. The machine readable storage of claim 1, wherein the plug-in receptor is compliant a J2EE Connector Architecture.

4. The machine readable storage of claim 1, wherein each of the load balancing algorithms is contained within a J2EE compliant resource adaptor of a corresponding voice server.

5. The machine readable storage of claim 4, wherein each of the different voice servers contains a speech load balancer servlet that provides an interface for exchanging information between the voice server within which it is contained and the load balancer.

6. The machine readable storage of claim 1, wherein the speech processing specific factors and specifics of the load balancing algorithms running in the voice servers are abstracted from the load balancer, which lacks these specifics and bases its decisions upon the speech utilization scores conveyed to it by the different voice servers.

7. The machine readable storage of claim 1, wherein different ones of the load balancing algorithms calculate speech utilization scores based upon different speech processing specific factors, which are unique to the voice server running the load balancing algorithms.

8. The machine readable storage of claim 1, wherein different ones of the load balancing algorithms calculate a speech utilization score based upon the same speech processing specific factors that are used by different one of the voice servers, but where different ones of the voice servers apply different weights to the speech processing specific factors in calculating a server specific speech utilization score.

9. The machine readable storage of claim 1, wherein each of the load balancing algorithms include a static operating mode and a dynamic operating mode, wherein when operating in the static operating mode, the load balancing algorithm calculates the speech utilization score using static ones of the speech processing specific factors, and wherein when operating in the dynamic operating mode, the load balancing algorithm calculates the speech utilization score using at least one dynamic speech processing specific factor.

10. The machine readable storage of claim 1, wherein said speech processing specific factors used to calculate the speech utilization score includes at least one automatic speech recognition (ASR) specific factor, and wherein said speech processing specific factors includes at least one text to speech (TTS) specific factor.

11. The machine readable storage of claim 1 wherein said speech processing factors include at least five of the factors from said group.

12. The machine readable storage of claim 1 wherein said speech processing factors include at least four of the factors from said group.

13. The machine readable storage of claim 1 wherein said speech specific factors includes a number of allocated ASR engines, a number of allocated TTS engines, a number of configured ASR engines, and a number of configured TTS engines.

14. The machine readable storage of claim 1, wherein the speech specific factors comprise the number of ASR engines allocated, the number of TTS engines allocated, a CPU MHz per channel for ASR, and a CPU MHz per channel for TTS.

15. The machine readable storage of claim 1, wherein the speech specific factors includes a duty cycle for ASR, a number of allocated ASR engines, and a number of configured ASR engines.

16. A method for automatically selecting one of a plurality of voice servers comprising:

a computer system hosting a load balancer stored in a tangible storage medium receiving a speech processing request;

the computer system executing the load balancer receiving speech utilization scores from a plurality of different voice servers remotely located from the load balancer, wherein each voice server calculates the speech utilization score using a speech utilization algorithm executing within the voice server, wherein said speech utilization algorithm includes at least three speech processing specific factors;

the computer system executing the load balancer selecting one of the plurality of different voice servers to handle the speech processing request, wherein the selected voice server is the one having the most favorable speech utilization score, wherein the speech processing specific factors used to calculate the speech utilization score include at least three factors selected from a group consisting of a number of allocated ASR engines, a number of allocated TTS engines, a number of configured ASR engines, a number of configured TTS engines, a CPU MHz per channel for ASR, a CPU MHz per channel for TTS, a duty cycle for ASR, a duty cycle for TTS, an average ASR latency, an average TTS latency, an average ASR grammar size, an average TTS grammar size, a total number of ASR processing requests, a total number of TTS processing requests, a number of active speech processing sessions, a total number of concurrent speech processing sessions permitted, an average length of ASR engine usage per session, and an average length of a TTS engine usage per session.

17. The method of claim 16, wherein said at least one speech utilization algorithm is contained within a J2EE compliant resource adaptor.

18. The method of claim 16, wherein the steps of claim 16 are performed by a computing device manipulated by the service agent, the steps being performed in response to a service request.

19. A system for handling speech processing request comprising:
- a plurality of voice servers for handling speech processing requests, each voice server including a speech load balancer servlet and a J2EE compliant resource adaptor, said resource adaptor of each of the plurality of voice servers comprising a load balancing algorithm that calculates a speech utilization score for the voice server within which the load balancing algorithm is located, where the calculation is based on at least three speech processing specific factors; and
- a load balancer, remotely located from any of the voice servers, configured to receive incoming speech processing requests, wherein said voice servers are configured to intermittently provide the load balancer with the speech utilization scores calculated using the load balancing algorithm executed within the voice servers, wherein the load balancer is configured to utilize the speech utilization scores to select which of the voice servers is to handle one of the incoming requests, wherein the speech processing specific factors used to calculate the speech utilization score include at least three factors selected from a group consisting of a number of allocated ASR engines, a number of allocated TTS engines, a number of configured ASR engines, a number of configured TTS engines, a CPU MHz per channel for ASR, a CPU MHz per channel for TTS, a duty cycle for ASR, a duty cycle for TTS, an average ASR latency, an average TTS latency, an average ASR grammar size, an average TTS grammar size, a total number of ASR processing requests, a total number of TTS processing requests, a number of active speech processing sessions, a total number of concurrent speech processing sessions permitted, an average length of ASR engine usage per session, and an average length of a TTS engine usage per session.

* * * * *